United States Patent
Zhang et al.

(10) Patent No.: US 8,340,159 B2
(45) Date of Patent: Dec. 25, 2012

(54) METHOD AND APPARATUS FOR MULTIRESOLUTION / MULTIPATH SEARCHER

(75) Inventors: Benyuan Zhang, Drexel Hill, PA (US); Paul Gothard Knutson, Lawrenceville, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 946 days.

(21) Appl. No.: 12/087,941

(22) PCT Filed: Jan. 27, 2006

(86) PCT No.: PCT/US2006/002934
§ 371 (c)(1),
(2), (4) Date: Jul. 17, 2008

(87) PCT Pub. No.: WO2007/086858
PCT Pub. Date: Aug. 2, 2007

(65) Prior Publication Data
US 2008/0317182 A1    Dec. 25, 2008

(51) Int. Cl.
*H04B 1/00* (2006.01)
(52) U.S. Cl. ........ 375/148; 375/137; 375/142; 375/150; 375/343; 375/355
(58) Field of Classification Search .......... 375/136–137, 375/142, 147–148, 150, 343, 355
See application file for complete search history.

(56) References Cited

U.S. PATENT DOCUMENTS

| | | | |
|---|---|---|---|
| 5,784,364 A | 7/1998 | Ahn et al. | |
| 6,055,264 A | 4/2000 | Kenney et al. | |
| 6,157,820 A | 12/2000 | Sourour et al. | |
| 6,693,955 B1 | 2/2004 | Arimitsu | |
| 2002/0094017 A1 | 7/2002 | Wang | |
| 2003/0012312 A1* | 1/2003 | Gerhards et al. | 375/343 |
| 2003/0235238 A1 | 12/2003 | Schelm et al. | |
| 2004/0076225 A1 | 4/2004 | You et al. | |

(Continued)

FOREIGN PATENT DOCUMENTS

CN    1146133    3/1997

(Continued)

OTHER PUBLICATIONS

International Search Report, dated Oct. 6, 2006.

*Primary Examiner* — Curtis Odom
(74) *Attorney, Agent, or Firm* — Robert D. Shedd; Robert B. Levy; Jorge Tony Villabon

(57) ABSTRACT

A multipath searcher and method includes a programmable decimation filter configured to adjust a sample rate of a received pilot signal. A plurality of correlators is configured to compare the received pilot signal to a reference code in a first mode and in a second mode. The first mode includes a low resolution search of a search window performed such that the plurality of correlators encompass an entire search window concurrently and the plurality of correlators receives a delayed reference code delayed to correspond with a portion of the search window in which a corresponding correlator performs correlation to identify peaks in the received pilot signal. The second mode includes a high resolution search of a refined search window only at or near identified peaks discovered in the first mode. The high resolution search is focused at the peak location by adjusting delays in the plurality of correlators.

30 Claims, 8 Drawing Sheets

U.S. PATENT DOCUMENTS

| | | |
|---|---|---|
| 2005/0047488 A1 | 3/2005 | Sugahara |
| 2005/0185697 A1* | 8/2005 | Gargin .......................... 375/130 |
| 2006/0007895 A1* | 1/2006 | Coralli et al. ................. 370/335 |

FOREIGN PATENT DOCUMENTS

| | | |
|---|---|---|
| CN | 1307413 | 8/2001 |
| CN | 1318921 | 10/2001 |
| CN | 1492610 | 4/2004 |
| CN | 1526206 A | 9/2004 |
| EP | 1079537 | 2/2001 |
| JP | 2001-069568 | 3/2001 |
| JP | 2003-158504 A2 | 5/2003 |
| JP | 2005-535880 | 11/2005 |
| JP | 2005-333456 A2 | 12/2005 |
| JP | 2005-539442 | 12/2005 |
| JP | 2006-005390 A2 | 1/2006 |
| WO | WO01/76087 | 10/2001 |
| WO | 03/007498 A1 | 1/2003 |
| WO | 2004/015444 A1 | 2/2004 |
| WO | 2004/028017 A1 | 4/2004 |
| WO | WO2004077692 | 9/2004 |

\* cited by examiner

METHOD AND APPARATUS FOR MULTIRESOLUTION / MULTIPATH SEARCHER

This application claims the benefit, under 35 U.S.C. §365 of International Application PCT/US2006/002934 filed Jan. 27, 2006 which was published in accordance with PCT Article 21(2) on Aug. 2, 2007 in English.

FIELD OF THE INVENTION

The present invention generally relates to multipath searchers and methods and, more particularly, to a system and method where multiresolution searching is performed to identify valid multipath energy peaks in a wireless environment.

BACKGROUND OF THE INVENTION

A mobile communication signal in wireless communication systems is transmitted between a base station (BS) to a mobile station (MS), e.g., a mobile phone or device. This signal may be reflected off numerous scattering objects, such as buildings or structures, before reaching the MS. As a result of these reflections, the wireless communication signal may propagate over many paths before reaching the MS or BS, for example. These reflected signals or multipath replicas represent replicas of the original wireless communication signal and arrive at the MS with variations in signal power levels, and times, due to varying signal propagation lengths. Upon receipt, the originally transmitted communication signal and the multipath replicas are filtered, despread, recombined and decoded to give the voice or data signal originally sent.

To search for the wireless communication signal, a multipath signal searcher is employed, along with a rake receiver in a CDMA communication system with the multipath signal searcher. The wireless communication signal is searched over a search window having a plurality of time offsets. The multipath signal searcher includes numerous search paths, each separately searching for the wireless (RF) communication signal at a particular time offset within the search window. The time offsets correspond to pseudo noise offsets in CDMA systems. In typical systems, the search paths within a multipath signal searcher function in either serial or parallel modes.

In serial operation, the multipath signal searcher searches through the first half of the search window for the mobile communication signal by having all the search paths within the multipath signal searcher search only those time offsets over the first half of the search window. The first half is searched in one search time slot and the remaining portion of the search window, or second half of the search window, is searched in the next search time slot. An integration period of a number of power control-groups (PCGs) in length-represents the entire non-coherent accumulation of a search metric over the integration period or the integration period can represent that a search metric may be coherently accumulated within different PCGs and non-coherently accumulated over the entire integration period. It takes a second integration period to search the remaining time offsets. With parallel operation, the searcher is able to search the entire window in one search time slot.

A multipath searcher in a code division multiple access (CDMA) system functions to identify valid multipath energy peaks in a wireless environment. Multipath searcher resolution is a critical parameter in mobile equipment designs. The higher the resolution, the better the multipath searcher performance. Higher resolution multipath searches will take more time and use more hardware resources than low resolution searches. Longer search times and more hardware resource requirements result in greater power consumption.

SUMMARY OF THE INVENTION

A multipath searcher and method includes a programmable decimation filter configured to adjust a sample rate of a received pilot signal. A plurality of correlators is configured to compare the received pilot signal to a reference code in a first mode and in a second mode. The first mode includes a low resolution search of a search window performed such that the plurality of correlators includes a number of correlators configured to cover an entire search window concurrently (or at least cover a significant fraction of the search window, e.g. half the search window, so that the search could be completed in two iterations) and the plurality of correlators receives a delayed reference code delayed to correspond with a portion of the search window in which a corresponding correlator performs correlation to identify peaks in the received pilot signal. The second mode includes a high resolution search of a refined search window only at or near identified peaks discovered in the first mode. The high resolution search is focused at the peak location by adjusting delays in the plurality of correlators.

In an alternate embodiment of the present invention, a multipath searcher includes a programmable decimation filter configured to adjust a sample rate of a received pilot signal, and a sequence generator configured to provide a reference signal for comparison to the received pilot signal. A plurality of correlators is configured to compare the received pilot signal to the reference code in a first mode and in a second mode, and a plurality of sequence delays are coupled to the plurality of correlators. The plurality of sequence delays are configured to delay the reference code sequence such that correlation activities are adjusted in accordance with a position in a search window. The first mode includes a low resolution search of the search window performed such that the plurality of correlators includes a number of correlators configured to cover the entire search window or portion thereof concurrently, and the plurality of correlators receives a delayed reference code delayed to correspond with a position in the search window corresponding to a given correlator to identify peaks in the received pilot signal by identifying matches between the received pilot signal and the reference signal. The second mode includes a high resolution search of a refined search window only at or near identified peaks discovered in the first mode. The high resolution search is focused at the peak locations by adjusting delays in the plurality of correlators using the plurality of sequence delays.

In an alternate embodiment of the present invention, a method for multipath searching includes filtering a received pilot signal using a programmable decimation filter configured to adjust a sample rate of the received pilot signal, and comparing the received pilot signal to a reference code in a first mode and in a second mode using a plurality of correlators, The comparing includes, in the first mode, searching a search window by performing a low resolution search of the search window such that the plurality of correlators includes a number of correlators configured to cover the entire search window or portion thereof concurrently and the plurality of correlators receives a delayed reference code delayed to correspond with a portion of the search window in which a corresponding correlator performs correlation to identify peaks in the received pilot signal. In the second mode, the searching employs one or more refined search windows in a high resolution search where the refined search windows exist only at or near identified peaks discovered in the first mode, the high resolution search being focused at the peak locations by adjusting delays in the plurality of correlators.

BRIEF DESCRIPTION OF THE DRAWINGS

The teachings of the present invention can be readily understood by considering the following detailed description in conjunction with the accompanying drawings, in which.

Figure 1:
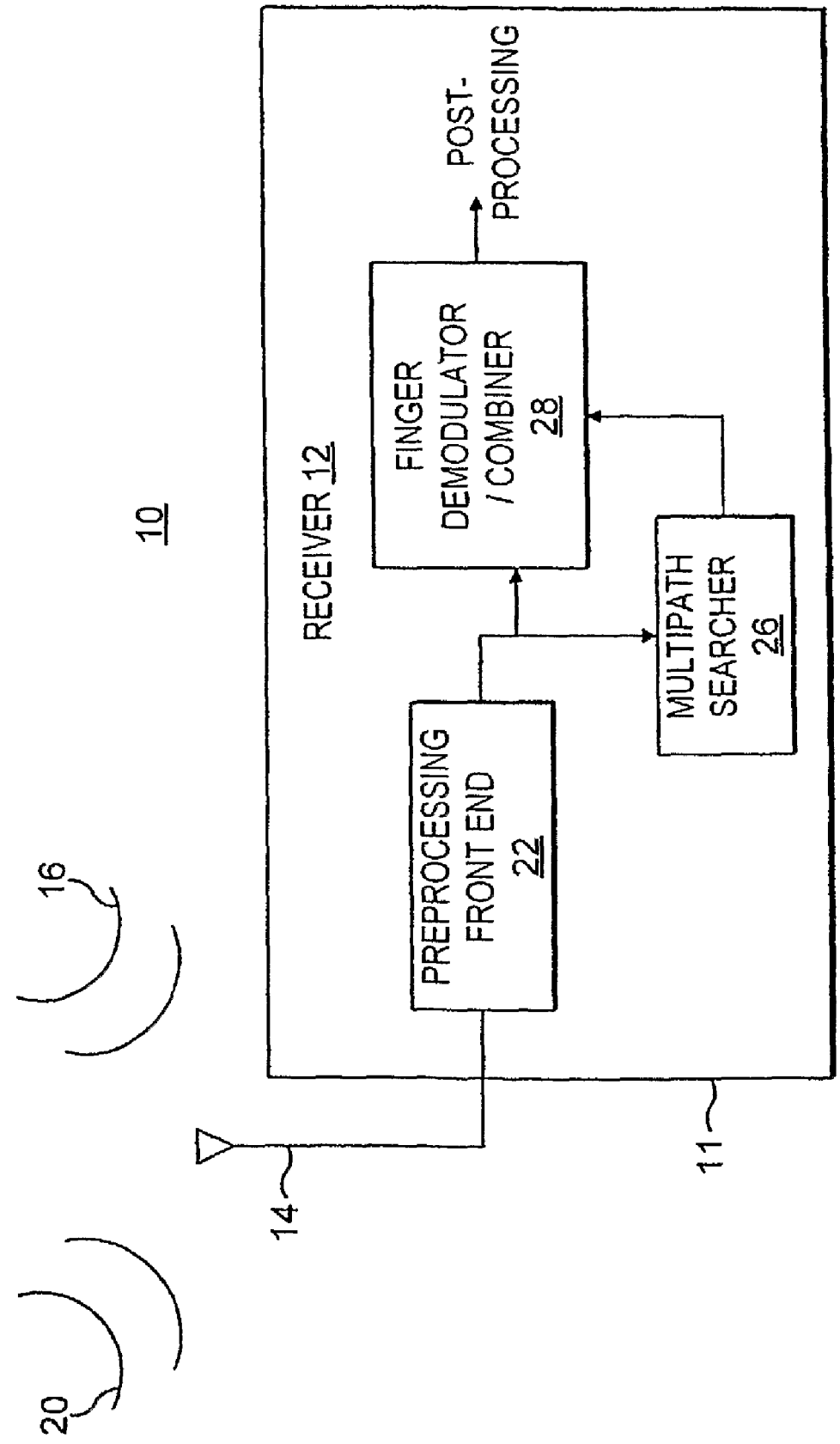
FIG. 1 depicts a high level block diagram of a system including a multiresolution/multipath searcher in accordance with one embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a system and method for multipath searching in wireless communication environments. Although the present invention will be described primarily within the context of a multipath searcher for CDMA applications, the specific embodiments of the present invention should not be treated as limiting the scope of the invention. It will be appreciated by those skilled in the art and informed by the teachings of the present invention that the concepts of the present invention can be advantageously applied in communication system which is capable of wireless transmitting and receiving of signals over a network. In addition, although several concepts of the present invention are described in terms of a cellular network, the concepts of the present invention may be extended to other wireless network types, such as satellite networks and the like.

It should also be understood that the elements shown in the figures provided herewith may be implemented in various forms of hardware, software or combinations thereof. Preferably, these elements are implemented in a combination of hardware and software on one or more appropriately programmed general-purpose devices, which may include a processor, memory and input/output interfaces.

FIG. 1 depicts a high level block diagram of a system including a multiresolution/multipath searcher in accordance with one embodiment of the present invention. In the system 10 of FIG. 1, a rake receiver 12 within a wireless communication device 11 (e.g., a base station or mobile device) searches a signal received by an antenna 14, where the signal received comprises a mobile communication signal 16 as well as any time offset multipath replicas 20. The signal received from the antenna 14 is communicated to a front-end processing block 22, and a signal output 24 is sent to a multipath signal searcher 26 and to a finger demodulator/combiner block 28.

The multipath signal searcher 26 searches the mobile communication signal 16. The multipath signal searcher 26 functions to search for signals at various time offsets by measuring a search metric, such as energy, of the received signal. From this measurement, the multipath signal searcher 26 creates or updates a listing of those time offsets which have a search metric above a certain threshold level, thereby identifying those time offsets which potentially include the desirable mobile communication signal 16.

The multipath signal searcher 26 of FIG. 1 includes a number of search paths. Each search path is associated with a particular time offset/position in a searching window and the searcher 26 identifies the various search paths.

Typically a multipath dispersion specification will determine a maximum searching window. A searching window may include a time dimension equal to a number of time offsets and an energy dimension within a preferred range of energy levels for the signal 16. A reasonable design has to cover the worst case scenario, for example, a desirable resolution within the maximum searching window. Accordingly, necessary hardware and software resources are allocated in advance to accommodate the specified searching window. The worst case needs to be handled due to the lack of knowledge of a multipath dispersion map before multipath searching.

In accordance with an embodiment of the present invention, a wide multipath searching range is provided with low resolution. As such, the size of the searching window can be expanded. Then, a high resolution search for neighbors of the energy peaks discovered in the low resolution search is performed. Because the number of multipaths is limited, it is possible to share resources between these operations. For example, if it is assumed that the resources needed for two times chip rate multipath searcher resolution is N, then 2*N resources are needed for four times chip rate resolution, and 4*N resources is needed for 8 times chip rate if the same searching method is used. Sample buffer size however will become very large when the searching resolution increases.

Another factor is that after the first searching (coarse searching), the energy peaks are scattered in the searching window. For the second search, the method is only interested in the neighbor points of the first searching result and not interested in the rest of searching window at all.

The typical approach is to store the sample data for correlation at a desirable rate. There are two disadvantages for this approach. One is that the sample buffer memory size is large. Another is that read data rate could be very high depending on a total number of correlators. The present invention will advantageously reduce memory usage and access clock rate while reducing power consumption.

Figure 2:
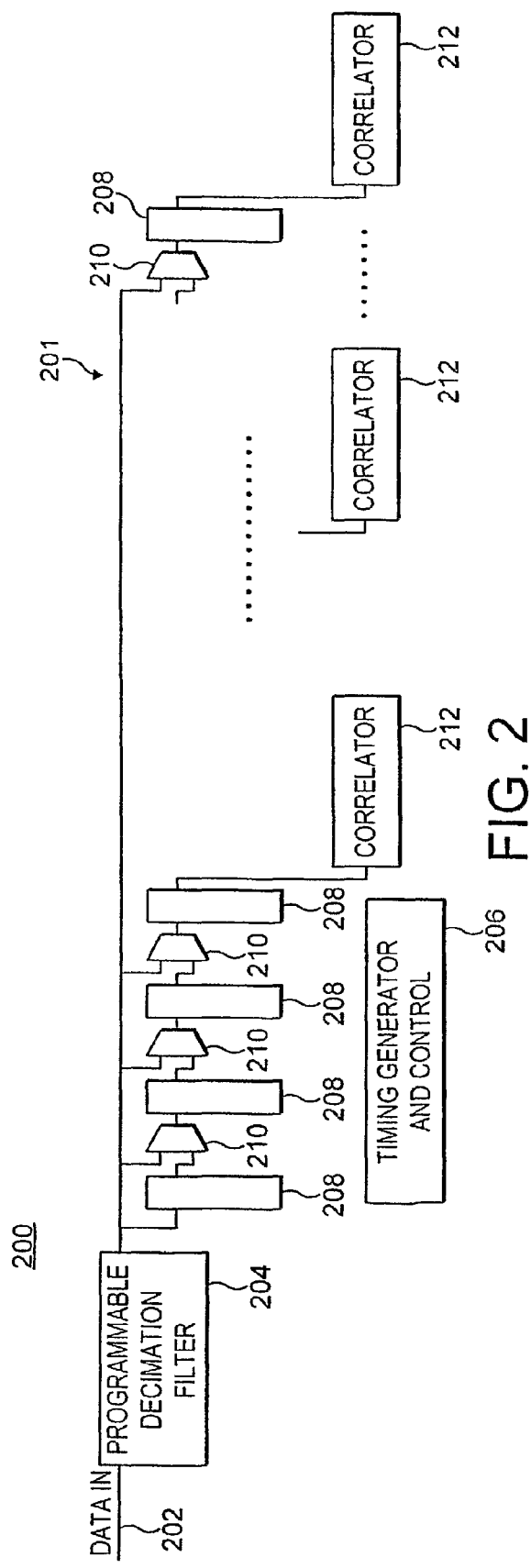
FIG. 2 depicts a high level block diagram of a programmable sample buffer suitable for use in the multipath searcher of FIG. 1 in accordance with an embodiment of the present invention.

FIG. 2 depicts a high level block diagram of a programmable sample buffer suitable for use in the multipath searcher of FIG. 1 in accordance with an embodiment of the present invention. The sample buffer 200 includes a data line 202 as an input, which receives a multipath pilot signal therein. A programmable decimation filter 204 can accept a rate that can be programmed as a configuration parameter. The rate can range from a coarse rate (C) (low resolution) to a fine rate (F) (high resolution). A timing generator and control block 206 supplies all necessary timing and control functions to the searcher to enable proper timing and control of components. Sample registers 208 include dual modes and are controlled by a control function block 210.

In the coarse searching mode, all registers 208 are serially connected. The correlators 212 are evenly placed for a whole searching space of the searching window. For example, the correlators 212 are sufficient in number to cover the time duration of the searching window. In the fine searching mode, the sample registers 208 have inputs directly connected with to the input data. The configuration of the registers 208 and the correlators 212 is controlled by the control block 210 based on the result of the coarse searching.

The programmable sample buffer 200 can be adapted to perform the searching methods of the present invention. Assuming the system works at clock rate R, a total number of the registers 208 is W*C and the total number of the correlators is W*C/R, where W is the length of the searching window. The decimation filter 202 at the front of a multipath searcher 201 has a rate programmed between C to R. Registers 208 may include modified shift registers. These registers 208 can work in two different modes: shift register mode and sparse segment shift register mode. Shift register mode is used for coarse searching and sparse segment shift register mode is used for fine searching. Sparse segment shift mode is adapted to focus only on peaks in the received pilot signal. In this way, delays are introduced in the registers 208 until areas of interest (peaks) are encountered.

In coarse searching mode, a total of W*C/R correlators 212 are placed evenly every R registers. The data rate is the coarse searching resolution rate C. So there are a total of W*C multipath searching points. After a first pass, a multipath profile is obtained (a map of delay dispersion). Available correlators (W*C/R) are preferably larger in number than the multipath number (N).

Figure 3:
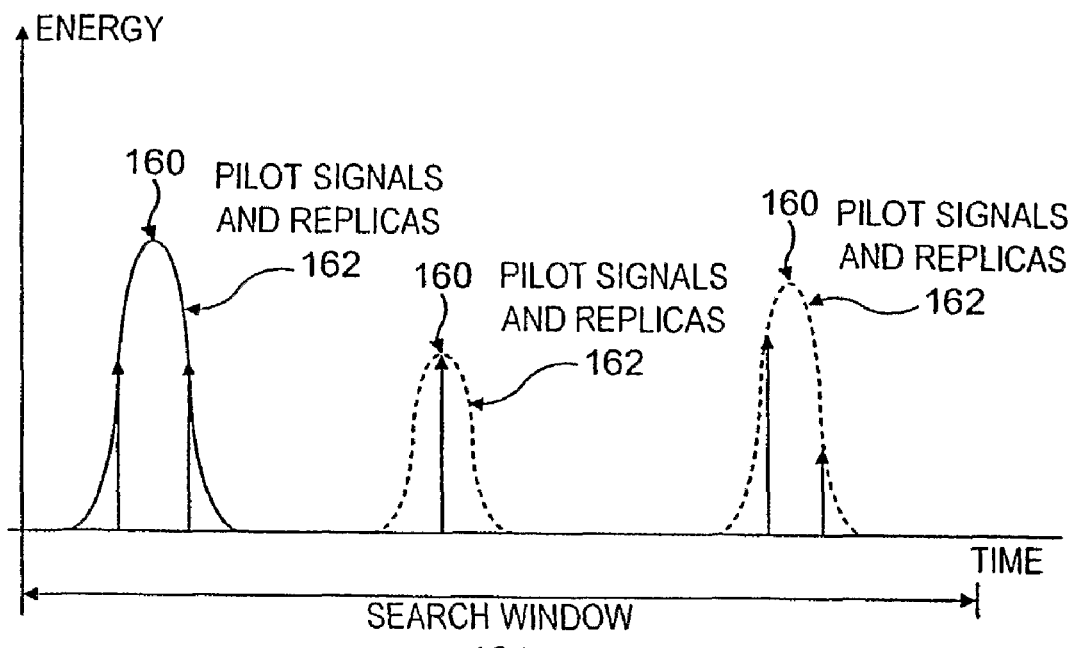
FIG. 3 depicts a delay dispersion map illustrating the results of a coarse search in accordance with an embodiment of the present invention.

FIG. 3 depicts a delay dispersion map illustrating the results of a coarse search in accordance with an embodiment of the present invention. The dispersion map of FIG. 3 includes energy on the y-axis and time on the x-axis as a result of coarse searching. Since the coarse map is sampled at a low rate, less data is needed to be stored. When candidate multipath signals are encountered, the fine tuning is performed at higher resolution. The coarse resolution maps out potential peaks 160 in a pilot signal (normally this signal pattern is known by both transmitter and receiver) and its replica signals 162 by scanning over the entire search window 164. The peaks 160 are found by comparing a sampled version of the received signal 162 to a reference sequence code for matches. Due to the low resolution correlation, the search results may not reflect the actual multipath profile, as illustrated in the three multipath replicas shown in FIG. 3. With low resolution correlation, the best result is not the first path but the third path. This will impact receiver performance since the strongest multipath was not found. In other words, exclusive use of coarse searching will degrade the system performance.

Referring back to FIG. 2, the fine searching mode is applied and the registers 208 are configured to sparse segment searching mode. In this mode, the correlators 212 are located based on the energy peak location of the first (coarse) pass. Every correlator 212 should work for one chip duration (R) around the energy peak location of the first pass. Optimization should be considered based on the working clock rate R, resolution and the correlators 212. After the fine searching is finished, higher resolution multipath searching results are obtained.

Figure 4:
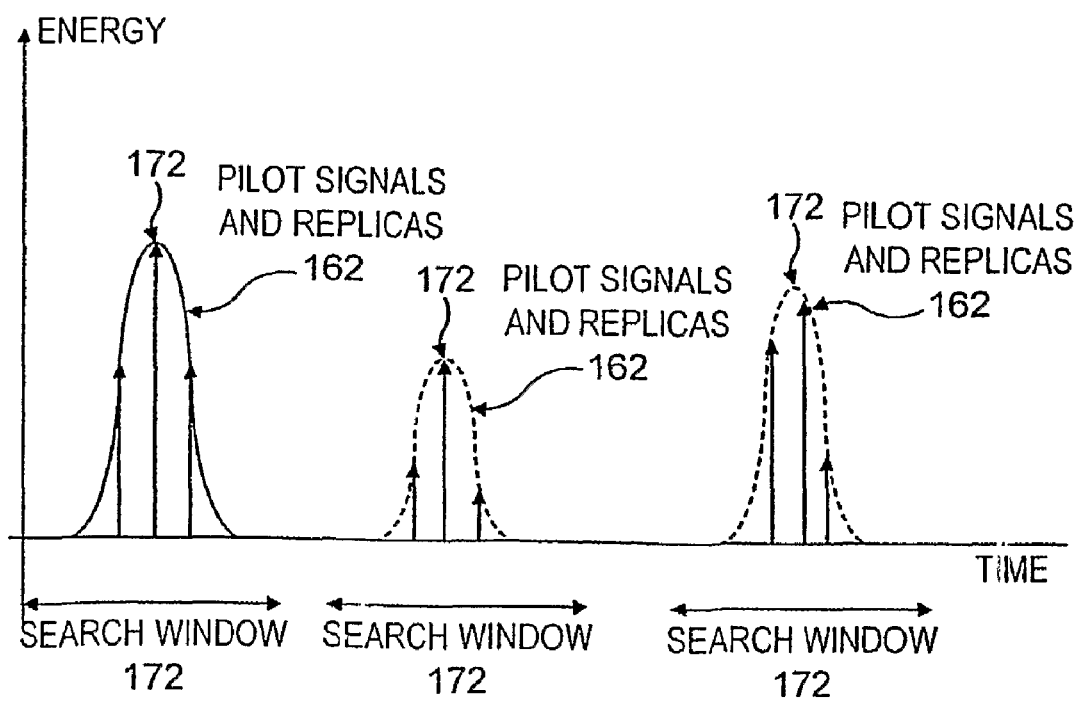
FIG. 4 depicts a delay dispersion map illustrating the results of a fine search in accordance with an embodiment of the present invention.

FIG. 4 depicts a delay dispersion map illustrating the results of a fine search in accordance with an embodiment of the present invention. In FIG. 4, fine tuning occurs only in areas 172 of suspected peaks. The resolution in this example is the magnitude of R (the chip duration in a refined search window 172).

Figure 5:
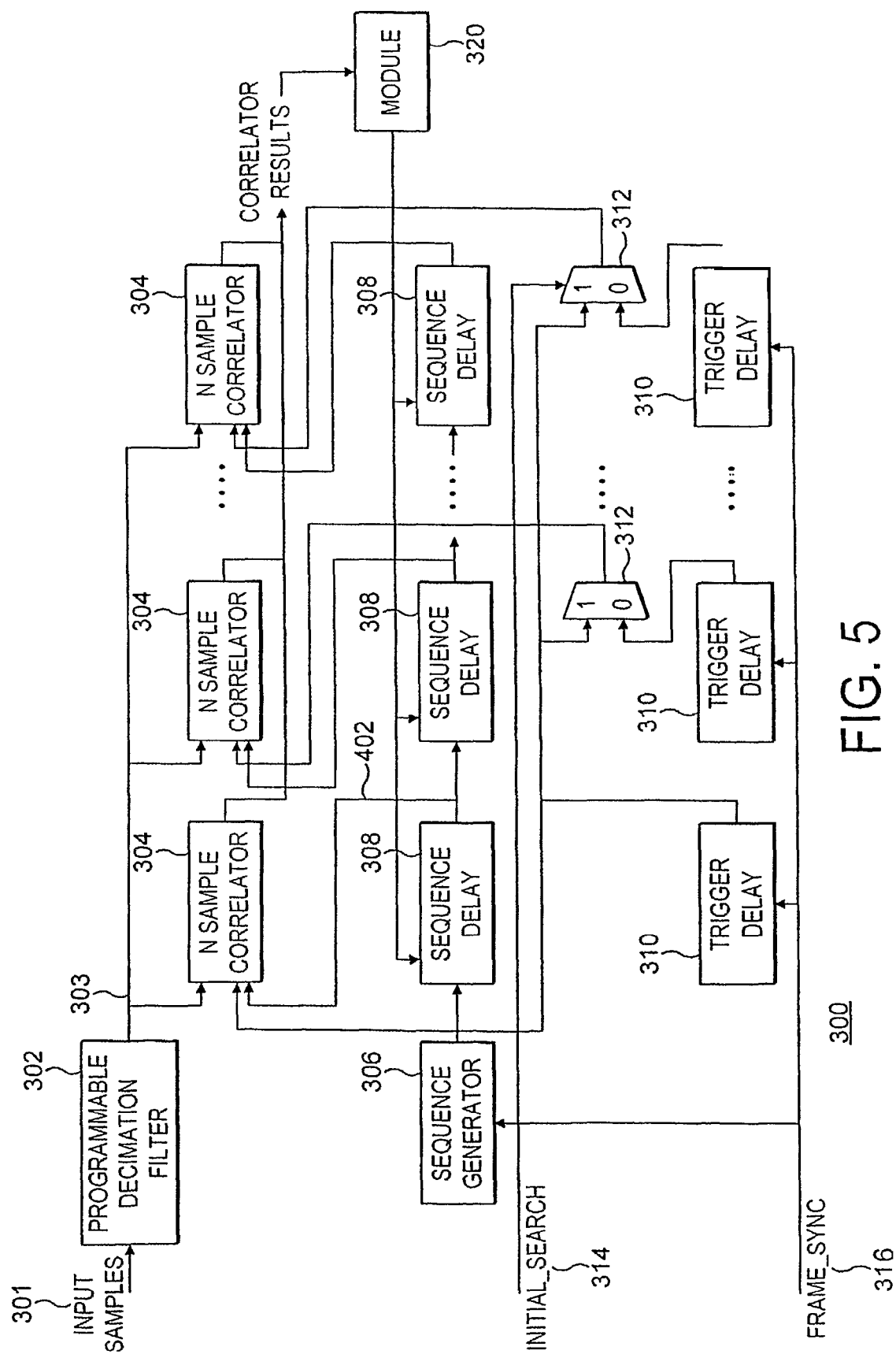
FIG. 5 depicts a high level block diagram of a multipath searcher in accordance with one embodiment of the present invention.

FIG. 5 depicts a high level block diagram of a multipath searcher in accordance with one embodiment of the present invention. Sample, sequence, and trigger delays are used to set up correlations at different delays to track the locations of the multipaths. The multipath searcher 300 of FIG. 5 includes a programmable decimation filter 302 (which functions as the filter 204 of FIG. 1, described above). Samples are input to the filter 302 and filtered in accordance with the programmed sample rate. The output of the filter 302 includes samples which are spaced apart along the search window.

The programmable decimation filter 302 reduces the sample rate for coarse correlations. An input sample rate 301 can be, for example, 4 or 8 times a chip rate, while in accordance with one illustrative embodiment, the desired coarse correlation would be 1 or 2 times the chip rate. Note that with a processing clock, C, of 64 times the chip rate, only 8 correlation bins per sample can be computed, whereas at 1 times the chip rate, 64 correlation bins per sample could be computed.

The correlators 304 receive data samples from the filter 302 and correlate the data samples to a code sequence 402 generated by a sequence generator. The code sequences are appropriately delayed by the sequence delays 308 to provide alignment between the data samples and the code sequences 402. Trigger delays 310 provide synchronization to properly synchronize the operation of the correlators 304. Multiplexers, 312 are employed to ensure that the trigger delays ~310 are activated together and in accordance with an initial_search signal 314. A frame synch signal 316 activates the trigger delays 310 and the sequence generator 306 to maintain the synchronization of operations of the multipath searcher circuit 300.

The sequence generator 306 produces a local (reference) copy of a pilot signal. The pilot signal is employed for detecting multipath signals and the reference copy will be compared to the sampled incoming signals (input signals 301). The local pilot signal generated by the sequence generator 306 is synchronized to the incoming input signal using known means.

The sequence delays 308 time shift the reference signal output from the sequence generator 306. These delays 308 are programmed to the time span of the correlators 304 in coarse mode such that the entire search window is covered by the correlators 304. While in fine mode, the sequence delays 308 are adjusted to match the time delays of the peaks discovered in the coarse mode. Adjustment of the sequence delays 308 is preferably based on a review of the correlator results after the coarse search mode. In one embodiment of the present invention, a software module 320 receives the results from the correlators and determines the energy peaks of the received pilot signal by reviewing the accumulated sums from the correlators 304. These sums are associated with a position (time) in the searching window. When a peak region is determined in module 320, sequence delays are adjusted in preparation of the fine search mode that succeeds the coarse search. The time shift of the sequence delays 308 focuses the fine mode search only on the discovered peaks determined in the initial coarse search.

Figure 7:
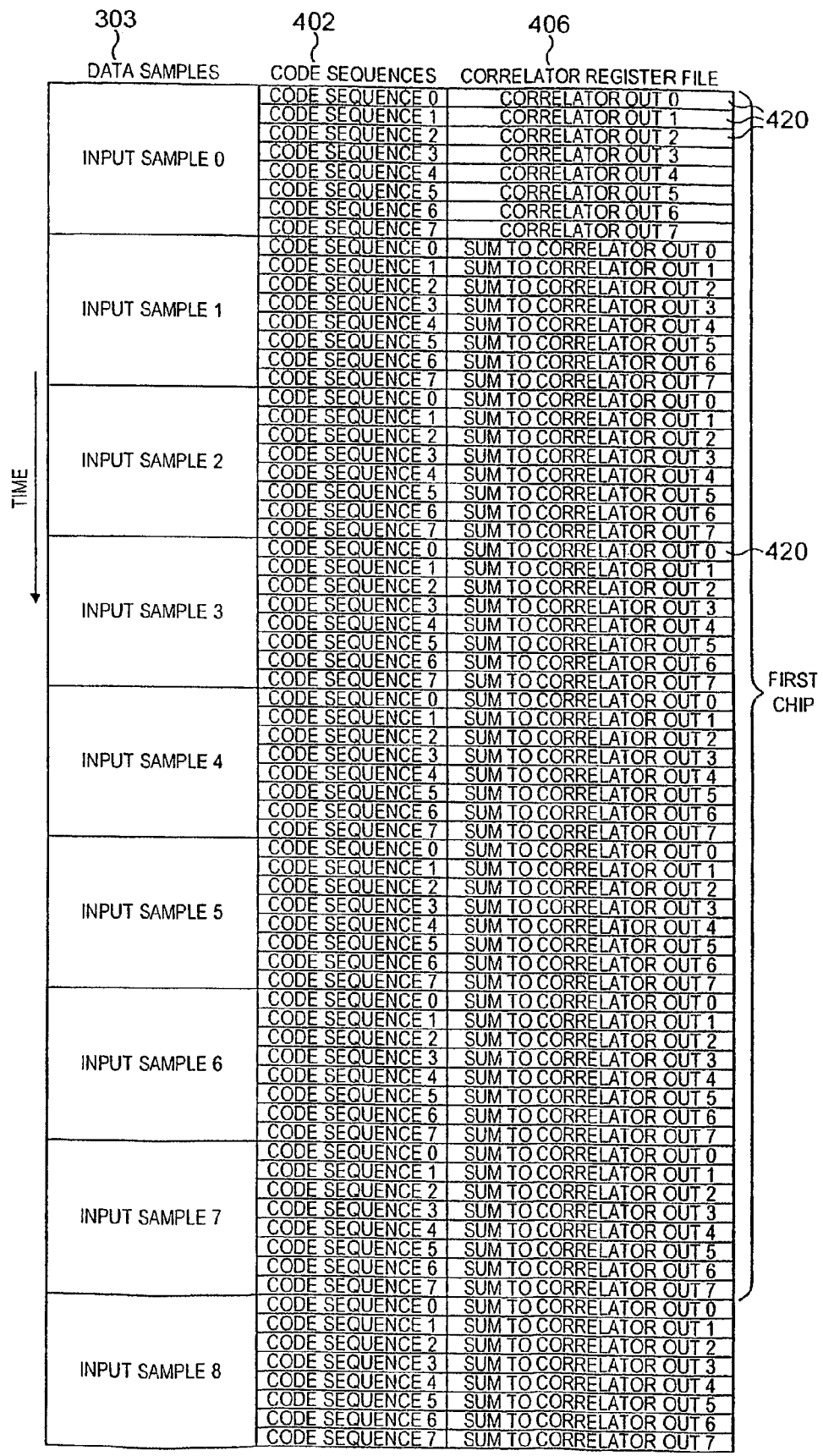
FIG. 7 depicts a table illustrating correlator results with 8 samples per chip in accordance with one embodiment of the present invention.

The reference data (code sequence) 402 is presented to the correlators 304 at the computation rate (e.g., 8× the data sample rate) by a shift register, multiplexer or other device (not shown). For example, FIG. 7 depicts a table illustrating correlator results with 8 samples per chip in accordance with one embodiment of the present invention.

The initial search signal (multiplexer) 314 is an optional operation, which forces all correlators 304 to start at the same time when performing the initial (coarse) search. The sequence delays 308 would be established so that a first correlator 304 receives code sequence 0 to 31, a next correlator (304) receives code sequence 32 to 63, etc. so that a continuous span of time would be covered by the correlators 304. The span of time corresponds with the size of the search window as described above.

Figure 6:
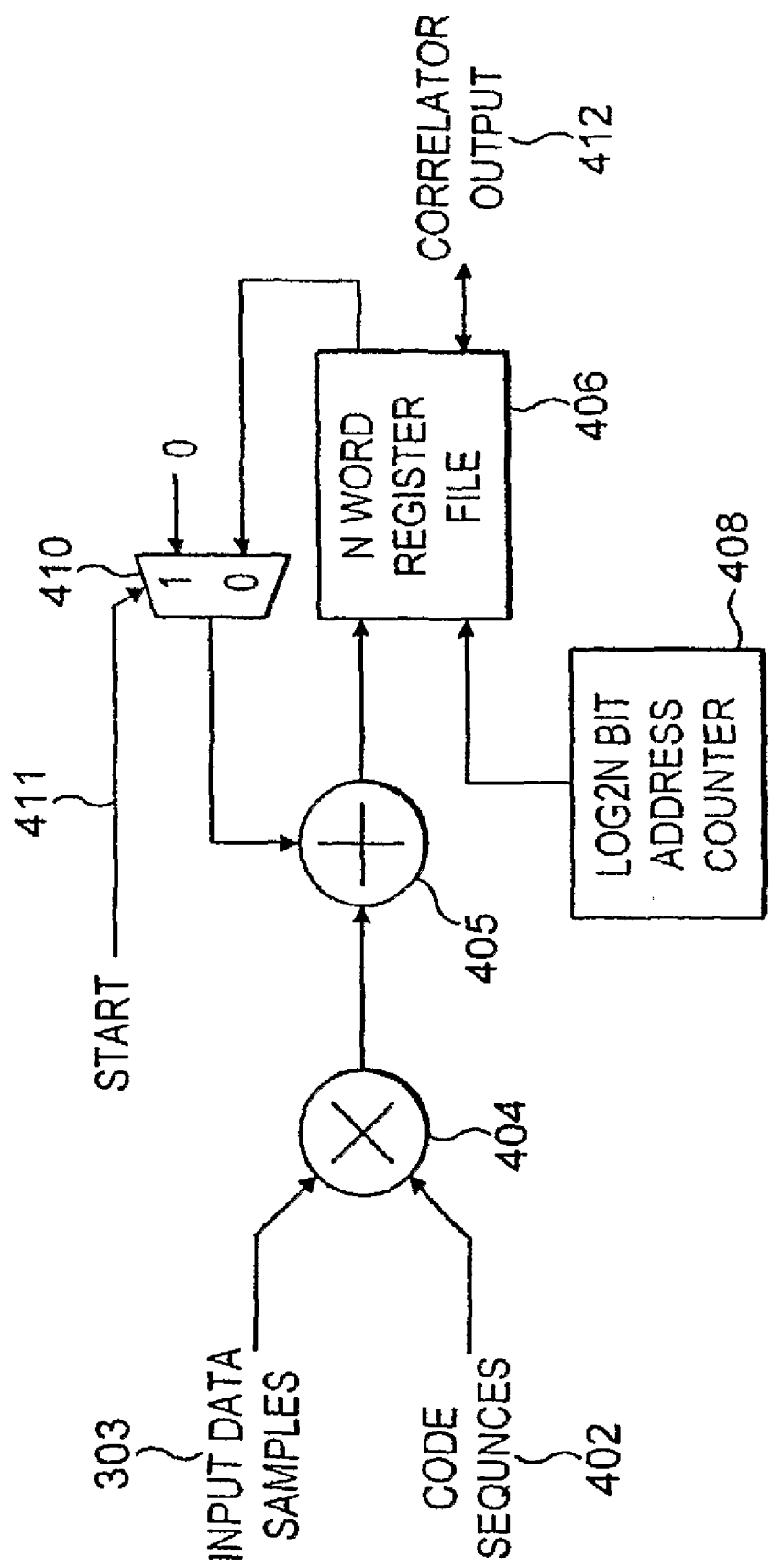
FIG. 6 depicts a high level block diagram of a correlator suitable for use in the multipath searcher of FIG. 5 in accordance with an embodiment of the present invention.

The trigger delays 310 of FIG. 5 inform the correlators 304 when to start. An initial chip period loads the correlators' accumulators with the received data 303. From that point on, the accumulators accumulate until the process is suspended by removing a write condition to the correlators 304. This operation may be performed using a "start" signal 411 as depicted in FIG. 6. That is, FIG. 6 depicts a high level block diagram of a correlator suitable for use in the multipath searcher of FIG. 5 in accordance with an embodiment of the present invention.

The trigger delays 310 decode time with respect to a reference (local) copy of the pilot signal. This is implemented by comparison to a counter, for example. The trigger delays 310 decode both a start signal for the correlators 304, as well as a write enable ("start" signal 411, FIG. 6 described below) for the register files 406 (FIG. 6) to indicate the duration of the correlation.

The correlators 304 correlate a code sequence to input data samples as filtered by the filter 302 and in accordance with the appropriate sample rate. The correlators 304 are described in greater detail with reference to FIG. 6.

Referring to FIGS. 6 and 7, the correlator 304 includes a register file 406 which stores the correlation results (correlation bins). Input data samples 303 from a received pilot signal are mixed with a code sequence 402 (derived from a reference pilot signal from sequence generator 306). As previously described, FIG. 7 illustratively depicts the operation of the correlators for an 8× chip rate for data samples 303 and 64× chip rate for the code sequence 402. As shown in this example, the data samples 303 are 8 times the chip rate. The code sequence 402 is applied at a computation rate of 64× the chip rate. This permits 8 correlation bins 420 in a register file 406 to be supported by one correlator 304. The correlation bins 406 are included in a correlator register file 406.

The input 402 is from a sequence delay 308. The sequence data 402 is cycled through the delays of the sequence which the correlators 304 use. This can be accomplished using a shift register or multiplexer, as known in the art, to ensure proper synchronization between the input data 303 and the code sequence 402. The sequence delay is applied to the reference sequence, in one example, for WCDMA, such that the delay may include a single bit representing +/−1 to describe the sequence. The code sequence is a binary signal (+/−1) synchronized to the pilot signal component of the received signal (input data samples). Over the course of a chip period, different shifts of the code sequence are presented to the correlator and the input signal is multiplied by each shift of the code sequence and the product is accumulated in the register file. In practice, the multiplier can be implemented as a multiplexer, and the code sequence can be a bit signal (0 or a 1) driving the select of a multiplexer choosing either the input signal or −1 times the input signal.

The input data samples 303 and the code sequences 402 (delayed if needed) are multiplied by a multiplier 404 to provide alignment of time shifts between the reference sequence and the received pilot signals. The product signal is input to a summer 405 which adds zero or the accumulated value in the register file 406. In a first instance, the sum is added to zero so that the register file stores code sequence 0 corresponding to input sample zero (see FIG. 7). This is performed for each of the 8 bins 420 by shifting the sum into a next bin by, for example in one embodiment, changing the memory storage address using an address counter 408. For a next sample, each of the 8 bins 420 is added to a next corresponding code sequence to accumulate a sum (see FIG. 7). The stored value in each bin 420 of register file 406 is multiplexed by multiplexer 410 to be summed by the summer 405 with a new incoming value. The accumulation process is enabled by start signal 411 which is provided by the trigger delays 310 depicted in FIG. 5. When the correlation period is completed, writing is suspended to the register file 406 in the correlator 304 by using the start signal 411 to disable the writing process.

Referring to FIG. 7, the clock rate is 8 times the sample rate. With every eight input samples, the correlator can correlate 8 chips of the code sequence, since the code sequence changes on chip boundaries (at the chip rate), each of 8 input samples is correlated with 8 shifts of the code. If, for example, the sample rate were reduced by 4, the correlator could correlate over 32 chips of the code sequence (same clock rate, lower sample rate). The code sequence 402 is provided to the correlator 304, and the activity performed in the register file is shown in column 406. In FIG. 7, time passes from top to bottom, each entry in columns 402 and 406 equals a clock period, and each input sample in column 303 lasts 8 clock periods.

Figure 8:
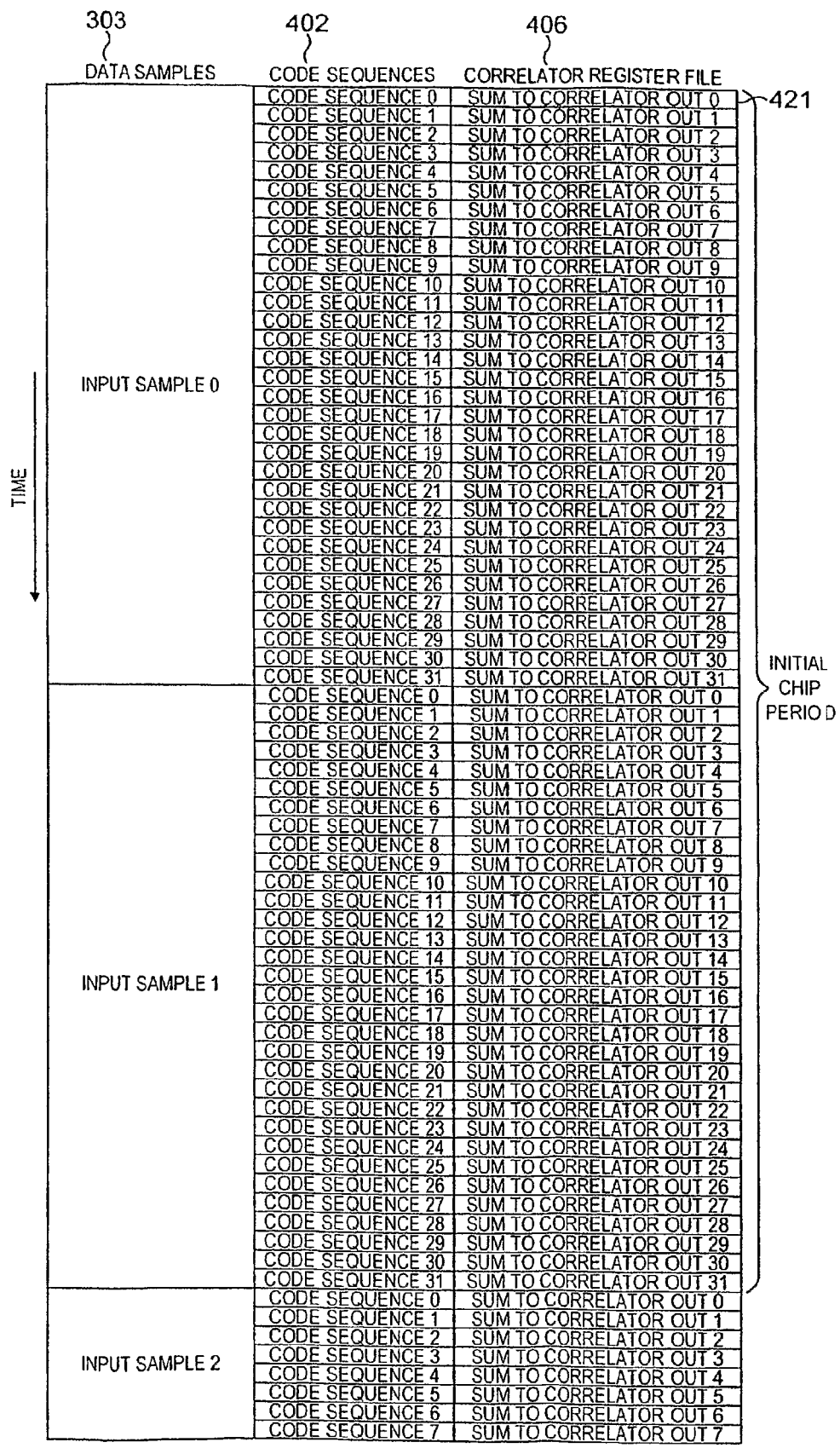
FIG. 8 depicts a table illustrating data presented to the correlators in a coarse 2 sample per chip mode in accordance with one embodiment of the present invention.

FIG. 8 depicts a table illustrating data presented to the correlators in a coarse 2 sample per chip mode in accordance with one embodiment of the present invention. As depicted in FIG. 8, the clock rate (code sequence and computation rate for the correlators 304) remains 64× the chip rate and 32× the sample rate.

Figure 9:
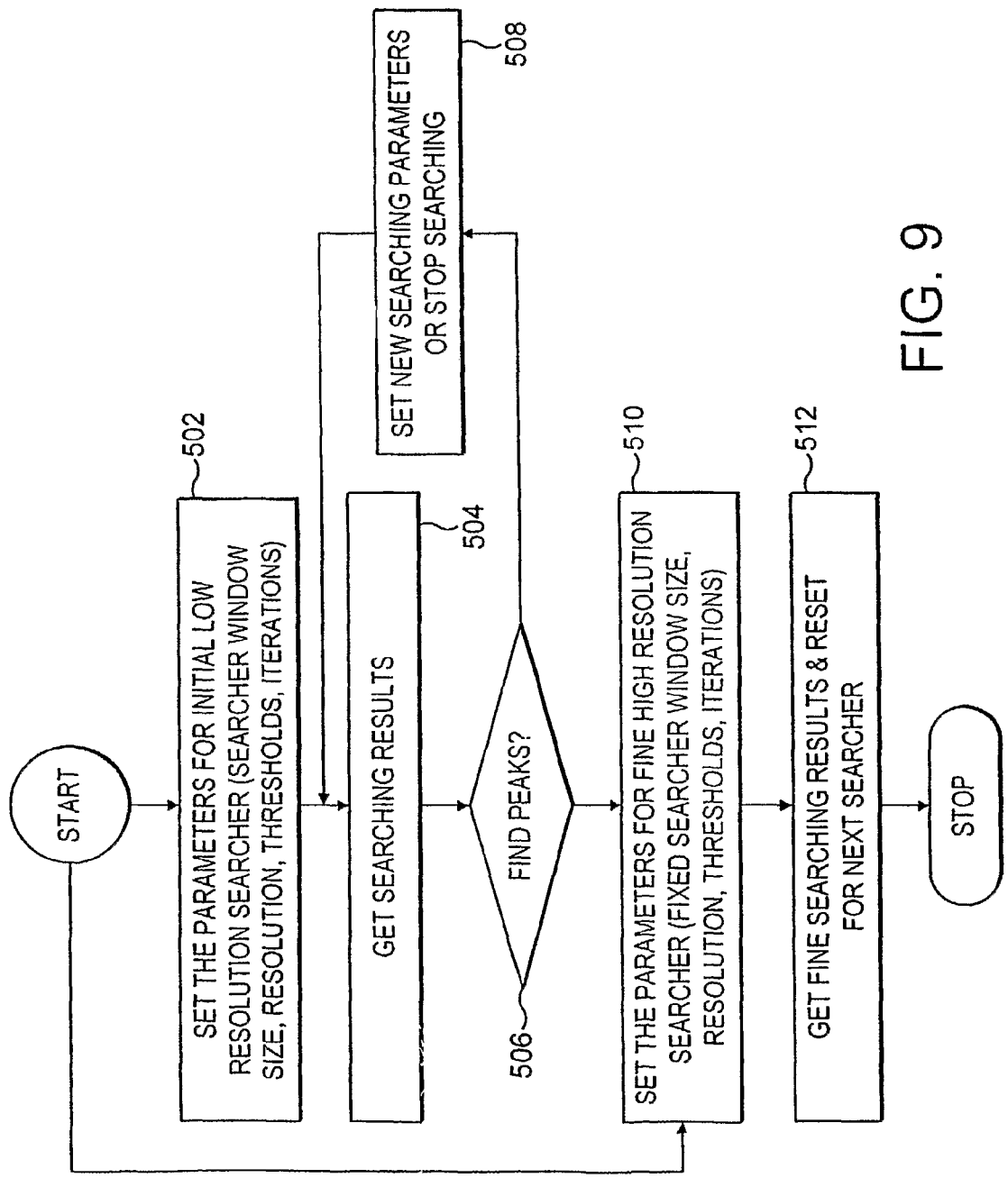
FIG. 9 depicts a block/flow diagram of a method for multiresolution/multipath searching in accordance with one embodiment of the present invention.

FIG. 9 depicts a block/flow diagram of a method for multiresolution/multipath searching in accordance with one embodiment of the present invention. In step 502 of the flow diagram of FIG. 9, parameters are set for the multipath searcher for an initial low resolution pass (coarse pass). The parameter may include searcher window size, resolution (e.g., select a number of samples), thresholds (e.g., energy thresholds for determining whether a peak has been discovered), a number of iterations (e.g., coarse mode searching may be performed in several low resolution passes, e.g. 10 iterations), etc. For a worst case scenario of the search of FIG. 9, a 256 chip searching range may be needed. This is illustrative of a searching window size. Depending on the channel conditions, the resolution of searcher could be chosen from 1, 2, 4 or 8 samples per chip. The low resolution pass preferably includes 1 or 2 samples per chip for the coarse multipath searching. This resolution will use less memory space than a high resolution pass. Setting the parameters also includes setting the multipath searcher with sufficient resources to handle appropriate system requirements. A programmable sample buffer may be needed to adapt the searching method. Registers can be used to avoid memory bus access sharing. For example, if a searching window length is W and sampling rate is S, then a total number of memory cells or registers is W*S and the number of correlators needed for the coarse mode would be W*S/R.

In step 504, a coarse searching is performed by the multipath searcher at a lower resolution to find approximate energy peak locations of a received pilot signal within the searching window. This is performed by using the correlators to correlate a delayed reference code signal to the received pilot signal to identify code matches. The identified code matches are assumed to be peak or near peak signals. In one embodiment of the present invention, a peak is identified as approximately 3 times the average noise level of the input signal. The result is identified portions which are candidate peak locations.

At step 506, it is determined if any correlation exist (if peaks are found). If no correlation exists (no peaks have been found) the method proceeds to step 508 to set new searching parameters for another iteration or, alternatively, stops searching if programmed to do so. However, if at step 506 correlation is found (peaks exist), the method proceeds to block 510 to begin fine searching.

At step 510, once the approximate peak locations have been identified in the coarse search, a high resolution search (or fine search) is configured to get more accurate multipath profiles. Parameters for the fine search include fixing the fine resolution search window in an area close to or at the candidate peak locations to further search for multipath signals. The fine search is performed at a higher resolution to find more details around the result of the first pass (coarse). The fine search resolution could be, for example, as high as the sample rate, S, (and the coarse searching resolution could as low as the chip rate, R).

Other parameters set for the multipath searcher for the high resolution pass (fine pass) may include resolution (e.g., select a sample rate), thresholds (e.g., energy thresholds for determining whether a peak has been discovered), a number of iterations, etc.

In block 512, the fine search is performed and the searching results are obtained and sent to appropriate components in a receiver, for example a cellular telephone or other wireless device. Such components may include a rake receiver or any other receiver or component that needs to eliminate or determine an appropriate signal from a plurality of replica multipath signals. The method is then resent for the next searching operation.

It should be understood that coarse searching needs to encompass an entire searching window while fine searching only needs to encompass a very small searching segment (normally one chip time duration or period). Furthermore, a number of paths supported may be limited (e.g., approximately 6 paths). During fine searching, only locations around peaks (identified searching results) are needed to be further searched. If the code sequence is matched at N (odd number) points, the points are arranged as (N−1)/2 for early points and (N+1)/2 for late points around the assumed peak. Such regions are focused on in the fine search. This reduces the memory usage by 2, 4, 8, etc. times.

In an alternate embodiment of the present invention, the searcher can be configured as an independent high resolution searcher when the searching window is relatively small. The threshold of the searcher profile could be decided through calculation and experiments. Normally, a searching profile includes the results of limited single multipath searcher iterations.

Having described preferred embodiments for a multiresolution/multipath searcher (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. As such, the appropriate scope of the invention is to be determined according to the claims, which follow.

The invention claimed is:

1. A multipath searcher comprising,
   a programmable filter configured to adjust a sample rate of a received pilot signal;
   a plurality of correlator adapted to compare the received pilot signal to a reference code signal in a first mode and in a second mode, and
   a same buffer adapted to receive sampled data from the from programmable filter to enable adjustments between a sample rate and a search resolution;
   wherein the sample buffer includes registers having a normal mode used during the first mode and a sparse segment shift register mode used during the second mode, and
   wherein the first mode includes a low resolution search of a search window and the second mode includes a high resolution search of a refined search window.

2. The multipath searcher of claim 1, wherein the low resolution first mode search is performed such that the plurality of correlators are configured to encompass the entire search window concurrently and the plurality of correlators receive a respective delayed reference code delayed to correspond with a respective portion of the search window in which a correlator performs correlation to identify peaks in the received pilot signal.

3. The multipath searcher of claim 1, wherein the high resolution second mode search of the refined search window is performed only at or near identified peaks discovered in the first mode, the high resolution search being focused at the peak location by adjusting delays in the plurality of correlators.

4. The multipath searcher of claim 3, wherein the identified peaks are identified by matching the reference code to the received pilot signal, and the search window at or near the identified peaks includes matched points.

5. The multipath searcher of claim 1, wherein the reference code is generated by a sequence generator.

6. The multipath searcher of claim 1, further comprising a plurality of sequence delays configured to adjust a delay of each correlator to align a search area of the search window with a corresponding correlator.

7. The multipath searcher of claim 1, wherein the received pilot signal is sampled at a sample rate between 4 to 8 times a chip rate and the low resolution mode operates at a rate of 1 to 2 times the chip rate.

8. The multipath searcher of claim 1, wherein the high resolution mode operates at a rate greater than the low resolution rate.

9. The multipath searcher of claim 1, further comprising a trigger delay circuit configured to concurrently initiate operations of the plurality of correlators.

10. The multipath searcher of claim 1, further comprising a module, which based on results from the plurality of correlators during the first mode, adjusts delays to the plurality of correlators to focus a search at peak locations during the second mode.

11. The multipath searcher of claim 1, wherein the search window includes 256 chips.

12. The multipath searcher of claim 1, wherein the programmable filter comprises a programmable decimation filter.

13. A multipath searcher comprising,
a programmable decimation filter adapted to adjust a sample rate of a received pilot signal;
a sequence generator adapted to provide a reference signal for comparison to the received pilot signal;
a plurality of correlators adapted to compare the received pilot signal to the reference code in a first mode and in a second mode;
a plurality of sequence delays coupled to the plurality of correlators, the plurality of sequence delays configured to delay the reference code sequence such that correlation activities are adjusted in accordance with a position in a search window; and
a sample buffer configured to receive sampled data from the decimation filter to permit adjustments between a sample rate and a search resolution;
wherein the sample buffer includes resisters having a normal mode used during the first mode and a sparse segment shift register mode used during the second mode, and
wherein the first mode includes a low resolution search of the search window performed such that the plurality of correlators encompass the entire search window or portion thereof concurrently and the plurality of correlators receive a respective delayed reference code delayed to correspond with a respective portion of the search window in which a correlator performs correlation to identify peaks in the received pilot signal, and
wherein the second mode includes a high resolution search of a refined search window only at or near identified peaks discovered in the first mode, the high resolution search being focused at the peak locations by adjusting delays in the plurality of correlators using the plurality of sequence delays.

14. The multipath searcher of claim 13, wherein the received pilot signal is sampled at a sample rate between 4 to 8 times a chip rate and the low resolution mode operates at a rate of 1 to 2 times the chip rate.

15. The multipath searcher of claim 14, wherein the high resolution mode operates at a rate greater than the low resolution rate.

16. The multipath searcher of claim 13, further comprising a trigger delay circuit configured to concurrently initiate operations of the plurality of correlators.

17. The multipath searcher of claim 13, further comprising a module which based on results from the plurality of correlators during the first mode adjusts delays to the plurality of correlators to focus the search at the peak locations during the second mode.

18. The multipath searcher of claim 13, wherein the search window includes 256 chips.

19. A method for multipath searching comprising,
filtering a received pilot signal to adjust a sample rate of the received pilot signal;
comparing the received pilot signal to a reference code in a first mode and in a second mode; and
using sampled data, in a sample buffer, from the filtering, to enable adjustments between a sample rate and a search resolution;
wherein the sample buffer includes registers having a normal mode used during the first mode and a sparse segment shift register mode used during the second mode, and
wherein the first mode includes a low resolution search of a search window and the second mode includes a high resolution search of a refined search window.

20. The method of claim 19, wherein the low resolution first mode search is performed such that a plurality of correlators adapted to compare the received pilot signal to the reference code in the first mode and in the second mode are configured to encompass the entire search window concurrently and the plurality of correlators receive a respective delayed reference code delayed to correspond with a respective portion of the search window in which a correlator performs correlation to identify peaks in the received pilot signal.

21. The method of claim 20, further comprising adjusting delays to the plurality of correlators to focus the search at the peak locations during the second mode.

22. The method of claim 20, wherein the high resolution second mode search of the refined search window is performed only at or near identified peaks discovered in the first mode, the high resolution search being focused at the peak location by adjusting delays in the plurality of correlators.

23. The method of claim 22, wherein the identified peaks are identified by matching the reference code to the received pilot signal, and the search window at or near identified peaks includes matched points.

24. The method of claim 19, further comprising generating the reference code using a sequence generator.

25. The method of claim 19, further comprising a plurality of sequence delays configured to adjust a delay of each correlator, adapted to compare the received pilot signal to the reference code in the first mode and in the second mode, to align a search area of the search window with a corresponding correlator.

26. The method of claim 19, wherein the received pilot signal is sampled at a sample rate between 4 to 8 times a chip rate and the low resolution mode operates at a rate of 1 to 2 times the chip rate.

27. The method of claim 19, wherein the high resolution mode operates at a rate greater than the low resolution rate.

28. The method of claim 19, further comprising concurrently initiating operations of a plurality of correlators adapted to compare the received pilot signal to the reference code in the first mode and in the second mode.

29. The method of claim 19, further comprising enabling adjustments between a sample rate and a search resolution.

30. A program storage device readable by machine, tangibly embodying a program of instructions executable by the machine to perform the steps of:
filtering a received pilot signal to adjust a sample rate of the received pilot signal;
comparing the received pilot signal to a reference code in a first mode and in a second mode; and
using sampled data, in a sample buffer, from the filtering, to enable adjustments between a sample rate and a search resolution;
wherein the sample buffer includes registers having a normal mode used during the first mode and a sparse segment shift register mode used during the second mode, and
wherein the first mode includes a low resolution search of a search window; and the second mode includes a high resolution search of a refined search window.

* * * * *